LOW ANGLE OF ATTACK – CRUISE

ANGLE OF ATTACK FOR SAFE MANEUVERING

HIGH ANGLE OF ATTACK – IMPENDING STALL

INVENTOR
AUGUST RASPET
BY
ATTORNEY

Feb. 26, 1963         A. RASPET                3,079,105
          RESERVE LIFT INDICATOR FOR AIRCRAFT AND THE LIKE
Filed Oct. 21, 1957                         3 Sheets-Sheet 2

STALLED

INVENTOR
AUGUST RASPET

BY *Jerome A. Gross*
ATTORNEY

Feb. 26, 1963 A. RASPET 3,079,105
RESERVE LIFT INDICATOR FOR AIRCRAFT AND THE LIKE
Filed Oct. 21, 1957 3 Sheets-Sheet 3

INVENTOR
AUGUST RASPET
BY *Jerome O. Gross*
ATTORNEY 3,079,105
RESERVE LIFT INDICATOR FOR AIRCRAFT
AND THE LIKE
August Raspet, Starkville, Miss.; Mabel Wilson Raspet,
executrix of August Raspet, deceased
Filed Oct. 21, 1957, Ser. No. 691,198
7 Claims. (Cl. 244—1)

This invention relates to the sensing of the reserve lift of a foil in a fluid stream, and particularly to that of an airfoil, such as the wing of a winged aircraft, maneuvered at high angles of attack approaching the stall.

Among the purposes of the present invention are: To provide a new method and apparatus whereby an airplane may be flown at high angles of attack with a continuous signal of the reserve lift of the wing; to utilize the incidence of turbulent bursts of fluctuation attendant the thickening of the boundary layer as a means for sensing the approach of stall safely in advance thereof, under all conditions of flight; to present to the controller of the aircraft a preferably aural signal of the decrease in reserve lift; to rid the signal of inconsequential turbulence; to present an additional visual signal, preferably at an angle of attack close to stall so as to serve as a warning thereof; and to provide inexpensive and reliable apparatus therefor.

The foregoing objects, together with others which will be apparent from the specification, are achieved in the preferred embodiments of invention hereinafter described and illustrated.

Considered generally, the present invention takes advantage of the facts which I have confirmed by extensive experiments:

That a lift-producing foil set at an angle of attack in a fluid stream will create a turbulent boundary layer along its negative pressure surface which increases in thickness markedly with increase of angle of attack up to stall;

That the thickening of the turbulent boundary layer is manifested at its outer edge not as a steady phenomenon, but in increasing, fluctuating bursts of turbulence by which the boundary layer is in effect intermittently crested.

The incidence and intensity of these intermittent crests of thickness of the boundary layer, as it swells to engulf a sensing point at a fixed distance from the airfoil surface, are, in the present invention, sensed by a turbulence-sensing probe or probes. These are located preferably well aft of the separation point of the flow at the stall, say between 50% and 80% of the chord length, and spaced from the negative pressure surface a distance greater than the thickness of the turbulent boundary layer at a low angle of attack of the foil and, at impending stall, at a distance between the crests and the troughs in the outer edge of the turbulent boundary layer.

Such turbulent bursts are characterized by "white noise," that is, including a very broad range of frequencies which may be sensed aurally. These are conveniently communicated to the controller of the airfoil by the conversion into an electrical signal. So that the signal may best serve the pilot of the aircraft as a guide to maneuvering the aircraft at high angles of attack in safety, it is conveyed to the pilot as an aural, slow-speed control signal in reference to which the aircraft may be maneuvered, reaching high intensity when stall impends. Near stalling angle, a visual signal, such as a red cockpit light, may be actuated to serve in place of a conventional stall warner. The advantages of the aural signal include, not merely that it requires no visual scanning, but also its readily-sensed change of volume over the range of angles of attack for safe maneuvering. In maneuvering an airplane at high angles of attack under the procedure herein disclosed, the pilot senses the air flow over the wing for intermittent bursts of turbulence, and maneuvers the wing to maintain an airspeed at which the turbulent bursts are sensed intermittently; thus the sensor is maintained in what may be thought of as the intermittent, fluctuating outer margin of boundary layer. The pilot is thus enabled to take advantage of the slow speed flight possibilities of the aircraft, being confident, however, that the level of the troughs of the crested boundary layer has not yet departed so far from the wing surface that stall impends.

Referring now to the drawings:

FIGURES 1, 2, 3 and 4 are sketches, somewhat exaggerated, of two-dimensional flow over the negative pressure surface of an airfoil, illustrating the thickening and increase of the incidence of turbulent fluctuations at the outer margin of the turbulent boundary layer, as follows:

In FIGURE 1, at low angle of attack as for cruise;

In FIGURE 2, at higher angles of attack, suited for safe maneuvering, such as climbing, gliding and in turns;

In FIGURE 3, for high angle of attack, as at impending stall; and

In FIGURE 4, at the stall.

Figure 1:
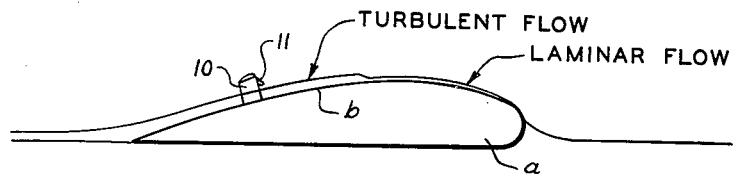
Figure 2:
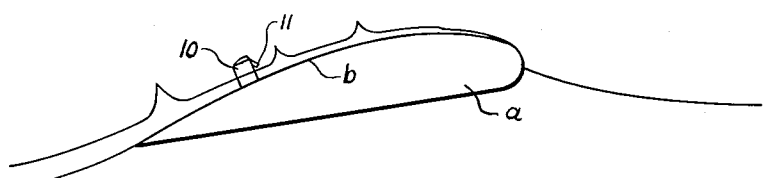

Referring to FIGURES 1 to 4, this cresting of the turbulent boundary layer is attended by, and is a function of, the adverse pressure gradient as friction slows the air flow. As the angle of attack is increased, the adverse pressure gradient becomes more marked; and the turbulent boundary layer rapidly thickens chordwise and the incidence of crests on its outer margin increases. The airfoil is generally referred to as $a$, and its negative pressure surface as $b$. A turbulence sensor, generally designated 10 and hereafter described, is shown located on the negative pressure surface $b$, with its inlet 11 at a level outside the turbulent boundary layer as it exists at low angle of attack as for cruise. The height of the turbulence sensor 10 is adjusted so that at fairly high angles of attack, safe for maneuvering, its sensor inlet 11, as shown in FIGURE 2, will be below, and therefore sense, intermittent crests in its thickness. As the angle of attack is increased to that shown in FIGURE 3, at impending stall, the turbulent boundary layer will have thickened and the incidence of its crests so increased that the sensor inlet 11 is at or (at the stall, per FIGURE 4) below the troughs of such fluctuating turbulence, so as to give a substantially continuous signal.

Figure 3:
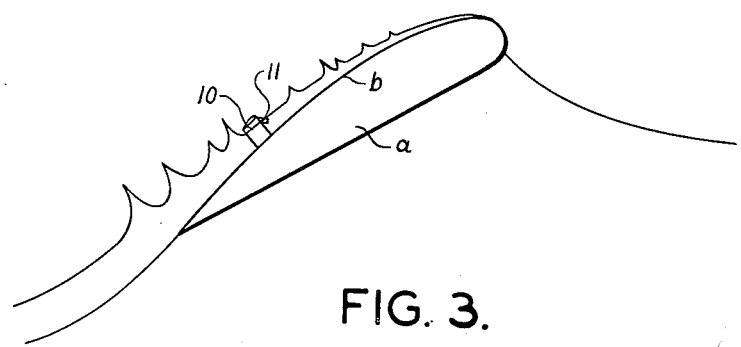

From a comparison of FIGURE 2 with FIGURE 3 it will be noted that the incidence of such fluctuations, even more than their intensity, increases with angle of attack. By varying the height above the negative pressure surface $b$ at which the turbulence sensor inlet 11 is located, the intermittency of the signal sensed can be adjusted. Pilots who fly from larger airports will prefer the signal to develop to its peak value in advance of actual stall, as shown in FIGURE 3, whereas pilots who operate from small fields, who need to maneuver close to the stall, will prefer the sensor inlet 11 to be located slightly higher, so that a continuous loud signal will indicate there is no more reserve of lift—that is, that the airflow has stalled.

Figure 4:
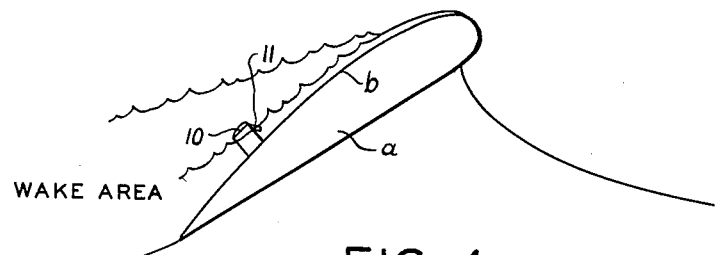

After the stall has occurred, the air will flow from the separation point outward, as in FIGURE 4, so that the sensor is in the separated wake area, highly turbulent at its upper portion but characterized by slow vortices therebeneath. Since it is desirable that the signal should continue undiminished after the stall, the sensor is best located well forward of the trailing edge, say preferably between the 50% and the 85% chord, and most advantageously about 65% to 70% of the chord.

Figure 5:
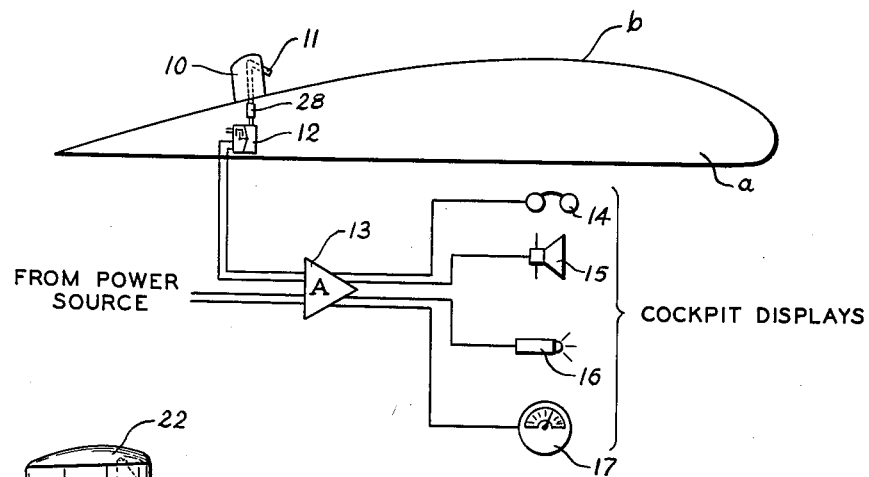
FIGURE 5 is a block diagram presenting one form of apparatus embodying the present invention.

In FIGURE 5, such a sensor 10 is shown mounted upon the negative pressure surface $b$ of the airfoil $a$ and connected to the other components of the apparatus in a typical installation. These components include a microphone or other transducer of pressure fluctuations generally designated 12, an amplifier 13, and various forms of cockpit signal displays including earphones 14, a loudspeaker 15, a cockpit warning light 16 and a voltage-responsive meter indicator 17.

Figure 6:
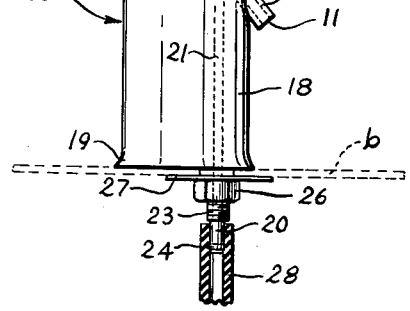
FIGURE 6 is an enlarged view of the turbulence probe included in FIGURE 5.

In FIGURE 6 the turbulence sensor 10 is shown in profile. It comprises an upstanding hollow streamline-shaped body 18, which serves as means to space the sensor inlet 11 from the negative pressure surface of the airfoil. The body 18 is preferably cast, with a base flange 19 and a downward-projecting tubular attachment portion 20 which projects therebeneath from its region of maximum thickness. The tubular attachment 20 and the body 18 have a common bore 21 which extends upward to near the upper closed end 22 of the body 18. Immediately below the base flange 19 the tubular attachment portion 20 has an external thread 23, and therebeneath a shallow exteriorly flanged tip 24 formed to a diameter less than that of the troughs of the thread 23.

Into a leading edge of the streamlined body 18 and extending forward and downward therefrom is a nose probe tube 25 affixed within the leading edge of the body 18. The bore of the nose probe tube 25 constitutes the inlet 11, and its upper aft end communicates with the upper end of the bore 21.

The sensor 10 is mounted through a bore in the surface $b$ by means of a nut 26 and washer 27 onto its lower end tubular attachment 20. Pressed thereon over the flanged tip 24 is a heavy-walled tube 28, preferably rubber, which serves as a resilient support for the pressure transducer 12 and as an acoustical communication means thereto.

Figure 7:
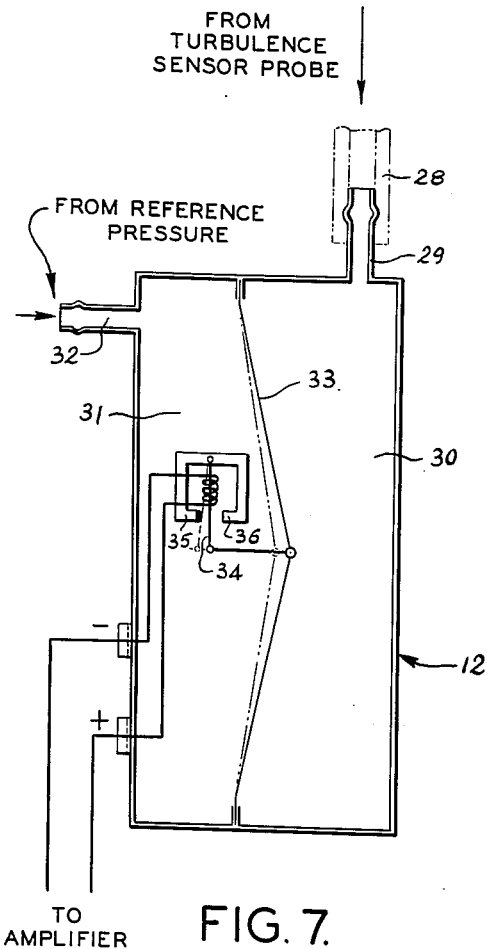
FIGURE 7 is an enlarged view of a pressure transducer included in FIGURE 5, shown somewhat schematically.

The pressure fluctuation transducer 12, shown schematically but in somewhat greater detail in FIGURE 7, has an upper end inlet 29 pressed into the lower end of the rubber tube 28, which serves as its shock-absorbing support. The transducer 12 has an inlet chamber 30, a reference pressure chamber 31 having a reference pressure inlet 32 whose opening is vented to a reference pressure—in a simple case, merely to the atmosphere within the airfoil $a$—and a diaphragm 33 separating the chambers 30, 31. The diaphragm 33 serves as a microphone diaphragm for the transducer, which is preferably of the moving armature type, with an armature 34 moved by the diaphragm 33 to vibrate between pole pieces 35, 36.

The signal from the pressure fluctuation transducer 12 its transmitted to the amplifier 13, supplied with current from a power source not shown. In contrast to prior art devices which communicate signals of pressure, this signal is of the "white noise" of intermittent fluctuating bursts of turbulence at the outer margin of the boundary layer.

It is desirable that other essentially acoustical disturbances, not reflecting the reserve lift diminution, be excluded. Hence the pressure fluctuation transducer 12 is supported in substantially vertical position to eliminate vibration caused by the jouncing of the aircraft over rough ground while taxiing.

Ambient noise, such as originates in the engine and propeller, may be present in the signal to a slight extent, normally so little as to be unobjectionable during periods of slow-speed maneuvering. At cruising speed, when the aircraft is in unaccelerated flight, the speed of the air flow over the portion of the negative surface $b$ where the transducer 12 is mounted results in an increase in the ram pressure over the reference pressure, deflecting the diaphragm 33 and pressing the armature 34 back against the aft pole piece 35, as shown in the dotted lines of FIGURE 7, and damping the response of the transducer. If then the airplane should be put into accelerated flight—as in a turn or pullout—the increased angle of attack accompanying such acceelration will cause an adverse pressure gradient at the rear portion of the wing where the sensor 10 is located, reducing the ram pressure at its inlet 11 sufficiently to unload the diaphragm 33. Hence, the transducer will signal the reserve lift under all conditions of flight at high angle of attack.

Figure 8:
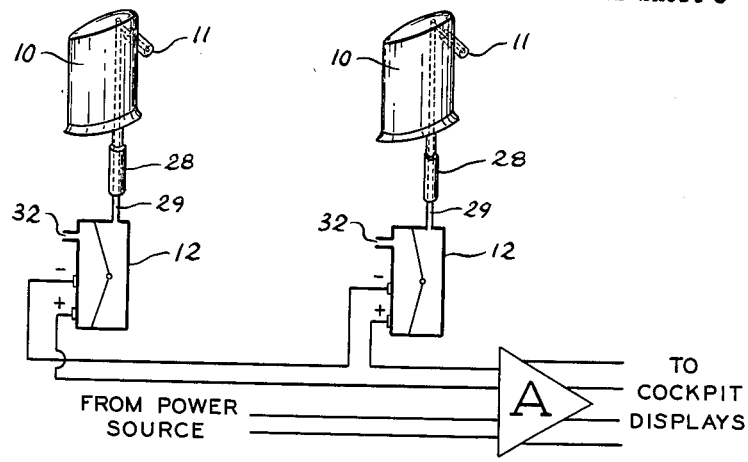
FIGURE 8 is a diagram of an alternate form of apparatus wherein periodic fluctuations, such as caused by the beat of propellers, are cancelled out of the sensed turbulence.

Propeller, engine and other ambient noises are further minimized by mounting the turbulence sensor 10 well outboard, for example, adjacent the ailerons. Should such outboard location be undesirable, or if the greater part of the wing is swept by the propeller wash, it may be desirable to use a pair of sensors 10, each having a probe 11 as hereafter described, and transducers 12, as shown in FIGURE 8. In this embodiment the sensors 10 are located fairly close to each other (preferably within a few inches), and at least a greater par of a chord length away from the source of disturbance and in any event substantially equidistant therefrom. They are connected in opposed series relationship (here shown with the negative terminals connected together) so that to the extent the vibrations sensed by them are periodic—as in the case of ordinary sounds—the output of one will cancel the output of the other. However, the "white noise" of the boundary layer turbulence is not periodic, but covers the range of frequencies which the transducer is capable of handling. Hence the turbulence signal is communicated to the pilot freed from such ambient noises.

For aircraft capable of extremely high speeds, the reference pressure inlet 32 is supplied with a pressure greater than atmospheric but less than stagnation pressure, to avoid any danger that the diaphragm 33 may blow out.

The downward slant of the nose probe tube 25 is provided to keep out rain when the aircraft is on the ground. Any downward angle is sufficient which provides for a down-drip of rain when the airplane is at ground attitude. The angularity illustrated in FIGURE 6 is adequate for aircraft with landing gear of the type including a tail wheel. In flight the sensor 10 is in a "dry" region of the wing; moisture in the airstream is accelerated as the airflow passes over the leading edge and centrifugal force drives it outward from the stream flow.

Figure 9:
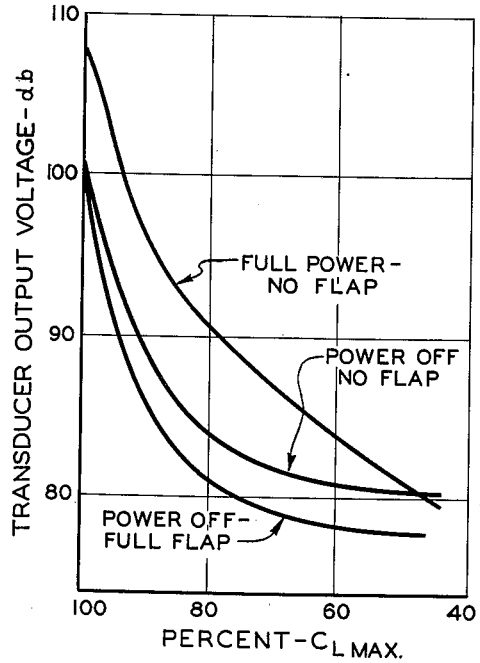
FIGURE 9 is a family of curves showing the transducer output voltage as a function of maximum lift coefficient for several flight conditions of a typical aircraft.

FIGURE 9 was plotted from test results using a typical light aircraft. The transducer output voltage increases sharply as the percent of maximum lift coefficient increases—that is, as the stalling angle is approached whether or not flap is used, and regardless of the weight of the aircraft and of conditions which may bring on the stall. From FIGURE 9 it is apparent that at, say 80% of maximum lift coefficient—at speed close to the stall—there will be a strong intermittent signal, compelling attention because of its increasing incidence; but yet far less demanding than the signal at maximum coefficient of lift. Thus a pilot may maneuver safely by reference to the audible signal alone, at a speed close to the maximum coefficient of lift, and taking full advantage of the full range of flight for which the aircraft was designed. This has not been possible with so-called "stall warners," which furnish no continuous signal of reserve lift by which the plane may be maneuvered.

The present invention is adaptable for use on any foil in a fluid stream whereby lift is generated. The negative pressure surface will be recognized as the lifting surface; this may be both surfaces of an airfoil—such as a vertical tail surface—having a portion deflectable in either direction. The type of microphone or other pressure transducer utilized may be varied; for some applications a piezoelectric crystal microphone may be best suited. Other sensors of fluctuations of turbulence not employing pressure fluctuation transducers may be substituted; for example, a "hot wire" anemometer, in which an electric-conducting wire is exposed to the intermittent fluctuations of turbulent air and its resistance is pulsingly varied, creating a signal which is then amplified and displayed to the pilot. Further, various modifications of installation will occur to those who are concerned over the problem of the stall of foils in fluid streams. Accordingly, the present invention is not to be construed narrowly, but instead as coextensive with the full scope of the claims.

I claim:

1. For signalling to the controller of a winged aircraft the decrease in reserve lift at high angles of attack of the wing, a sensor comprising a hollow member having a forwardly-presented open end, means to space said open end a fixed distance from the upper surface of the wing aft of the 50% chord point, a microphone, acoustical communication means between the hollow member and microphone to accumulate and impress the pressure at the forwardly-presented open end upon the microphone, and electrical means to communicate the response of the microphone to the incidence of bursts of turbulence in the airflow, sensed at the open end.

2. A sensor as defined in claim 1, the acoustical communication means comprising a microphone housing having an acoustical inlet and a resilient tube having one end secured to said inlet and the other end secured to the hollow member, whereby the housing is suspended resiliently from the hollow member.

3. A sensor as defined in claim 1, the microphone having a vibratable, signal-modulating member supported therein in substantially vertical position.

4. A sensor as defined in claim 1, the microphone including a diaphragm exposed on one of its sides to the air pressure at the forward-presented open end of the hollow member, and on its other side to a reference pressure, the microphone having vibration-damping means adjacent the reference pressure side of the diaphragm.

5. A sensor for signalling the decrease in reserve lift at high angles of attack of an aircraft wing and eliminating signals during unaccelerated cruising flight, comprising a hollow member having a forwardly-presented open end, means to space said open end a fixed distance from the upper surface of the wing aft of the 50% chord point, a transducer of a type responsive to intermittent bursts of turbulence in the airflow and having an inlet port connected in pressure-accumulating, pressure-communicating relation to the open end of the hollow member, a reference pressure port, and a diaphragm interposed between said ports, the transducer further having response-damping means whereby an increase in ram pressure at the forwardly-presented open end over such a reference pressure at the reference pressure port eliminates signals during unaccelerated cruising flight.

6. For signalling the reserve lift of a winged aircraft, turbulence-sensing means adapted to cancel periodic pressure fluctuations attending propelling the aircraft, comprising a pair of turbulence sensors positioned outwardly adjacent the negative pressure surface of the wing and substantially equidistant from the source of such periodic fluctuations, each having a pressure-fluctuation transducer in communication therewith, together with a source of electric power, an amplifier, a cockpit display responsive to the signal from the amplifier, and electrical connecting means connecting the output of the pressure-fluctuation transducers to the amplifier in series with their outputs opposed to each other.

7. For signalling the reserve lift of a winged aircraft, turbulence-sensing means adapted to cancel periodic pressure fluctuations attending propelling the aircraft, comprising a pair of turbulence sensors positioned outwardly adjacent the negative pressure surface of the wing and substantially equidistant from the source of such periodic fluctuations, each having a pressure-fluctuation transducer in communication therewith, together with a source of electric power, an electrically-actuated warning device, and electrical connecting means connecting the output of the pressure-fluctuation transducers to the warning device in series, with their outputs opposed to each other.

References Cited in the file of this patent

UNITED STATES PATENTS

| | | |
|---|---|---|
| 2,386,992 | Trott | Oct. 16, 1945 |
| 2,519,015 | Bensen | Aug. 15, 1950 |
| 2,603,695 | Campbell | July 15, 1952 |
| 2,635,152 | Dyche | Apr. 14, 1953 |
| 2,748,372 | Bunds | May 29, 1956 |

OTHER REFERENCES

Summary of Stall Warnings, NACA, TN 2676, TL 521, U 58, No. 2676 c2.